US008108224B2

(12) United States Patent
Froude et al.

(10) Patent No.: US 8,108,224 B2
(45) Date of Patent: Jan. 31, 2012

(54) METHOD AND SYSTEM OF IDENTIFYING POTENTIAL UNDER REPORTERS TO MONITOR COMPLIANCE IN REPORTING UNCLAIMED PROPERTY

(75) Inventors: Nancy A. Froude, Winchester, MA (US); Stephen J. Galvin, Holbrook, MA (US); Jeremy D. Katz, White Plains, NY (US); Lynden D. Lyman, Sudbury, MA (US); Robert B. Martens, Bradford, MA (US); Vincent P. O'Rorke, legal representative, Bradford, MA (US); Kenneth J. Weeks, Lynnfield, MA (US); David P. Whiteside, Berkeley Heights, NJ (US)

(73) Assignee: ACS State and Local Solutions, Inc., Washington, DC (US)

( * ) Notice: Subject to any disclaimer, the term of this patent is extended or adjusted under 35 U.S.C. 154(b) by 1835 days.

(21) Appl. No.: 11/015,889

(22) Filed: Dec. 17, 2004

(65) Prior Publication Data

US 2006/0136238 A1    Jun. 22, 2006

(51) Int. Cl.
    *G06Q 10/00* (2006.01)
(52) U.S. Cl. ..... 705/1.1; 705/68; 705/14.25; 705/14.26; 705/19; 705/24; 705/26.25; 705/30; 705/31; 705/33; 705/39
(58) Field of Classification Search .......................... None
    See application file for complete search history.

(56) References Cited

U.S. PATENT DOCUMENTS 7,054,833 B1 *  5/2006  McDonald ...................... 705/26

OTHER PUBLICATIONS

ACS to Acquire Unclaimed Property Services Division of State Street Corporation. (Dec. 11, 1998). PR Newswire,1.*
Business/Technology Editors. (Dec. 11, 1998). State Street to Sell Unclaimed Property Services Division to Affiliated Computer Services, Inc. Business Wire,1.*
"What to do with a returned paycheck"; Anonymous. IOMA's Payroll Manager's Report. Washington, DC: Mar. 2002. vol. 02, Iss. 3; p. 4; Attached Packet, A-B; (4 pages).*
ACS Unclaimed Property Clearinghouse, *The Little Book About Abandoned Property* 6th Edition, 2003.
Unclaimed Property Clearinghouse Executive Committee Meeting Chicago, Illinois, Jul. 12-13, 1993, pp. 16-23.
System User's Gyide, Wagners & Associates, (2005), pp. 185-190.
Unclaimed Property Cleaninghouse Executive Committee Meeting, Boston Massachusetts, Dec. 4-5, 1995, pp. 9-14.
*The Little Book Avout Abandoned Property®* 5th Edition, The National Abandoned Property Processing Corporation, 2002.

\* cited by examiner

Primary Examiner — Matthew Brooks
(74) *Attorney, Agent, or Firm* — Alston & Bird LLP

(57) ABSTRACT

Methods, apparatus and computer program products are provided for monitoring compliance in reporting unclaimed property. The method is capable of identifying both potential non-reporters and potential under-reporters. In this regard, potential under-reporters may be identified as a result of a multilevel review that may take into account the recent reporting history, both in terms of frequency and the type and quantity of unclaimed property that has been reported. The potential non-reporters and potential under-reporters may then be further evaluated, such as by means of an audit or other follow up procedure, to insure compliance.

17 Claims, 5 Drawing Sheets

FIG. 2.

METHOD AND SYSTEM OF IDENTIFYING POTENTIAL UNDER REPORTERS TO MONITOR COMPLIANCE IN REPORTING UNCLAIMED PROPERTY

FIELD OF THE INVENTION

The present application relates generally to methods, apparatus and computer program products for monitoring compliance in reporting unclaimed property and, more particularly, to methods, apparatus and computer program products for identifying candidate entities that are considered to have a reporting obligation and for further evaluating the candidate entities to identify potential under-reporters.

BACKGROUND OF THE INVENTION

Many, if not most, companies have unclaimed property that is held by a company for its rightful owner. While holding the unclaimed property, a company is required to file reports annually with one or more states and/or jurisdictions (hereinafter collectively referred to as "states") and to eventually remit the unclaimed property to a state if the owner does not recover the unclaimed property in the meantime. In the absence of the rightful owner, a state holds the unclaimed property in perpetuity for the rightful owner or heir. Prior to recovery by the owner or heir, funds are used for the benefit of the state and its citizens.

Unclaimed property generally consists of intangible personal assets and the contents of safe deposit boxes. Intangible personal assets can be divided into two broad categories: securities-related property and general ledger property. Securities-related property includes stocks, bonds, dividends and interest. Examples of general ledger property include payroll, vendor checks, advance deposits, credit balances, gift certificates, insurance proceeds and prepaid credit cards and other balances. A more complete listing of types of abandoned property is provided by Appendix A of *The Little Book About Abandoned Property*, 6th Edition, ACS Unclaimed Property Clearinghouse (2003), the contents of which are incorporated by reference herein.

Each state has a statute that governs the disposition of unclaimed property. The purposes of the statutes are generally to reunite owners with their unclaimed property, prevent subsequent claims by the owner against the company that originally held the unclaimed property on behalf of the owner after the company has transferred the property to the state, and to ensure that if an owner cannot be found, the economic windfall attributable to the return on an investment of the unclaimed property inures to the citizens of the state, not to the company that initially held the unclaimed property. Pursuant to the various state statues, property is generally considered unclaimed when there is lack of owner-generated activity. Evidence of the lack of owner-generated activity may include the failure to cash a check, the return of correspondence or a check by the U.S. Postal Service as being undeliverable or the absence of any other communication from the owner. Property is, in turn, considered abandoned when it remains unclaimed for a predefined number of years, as prescribed by a particular state's statute. The period during which the property remains unclaimed prior to becoming abandoned is referred to as the dormancy period. Dormancy periods vary by type of property and by state, but are frequently 3, 5 or 7 years. After the dormancy period the company is required to report the property, either to the state of the last known address of the owner or, if the company's records do not indicate an address or identify the owner, to the company's state of incorporation. Although the requirements vary by state, companies that hold unclaimed property often also have an obligation to attempt to notify the owner of the unclaimed property. Again, although the timing will vary depending upon each state's statutes, the company is eventually required to remit the abandoned property to the state of the last known address of the owner or, if the company's records do not indicate an address or otherwise identify the owner, to the company's state of incorporation. Reporting is an annual obligation, with reporting deadlines that vary from state to state. Depending upon its statute, the state may then attempt to contact the owner and, in any event, thereafter holds the abandoned property on behalf of the owner. While holding the property on behalf of the owner, however, the state can invest the abandoned property with the interest on that investment inuring to the benefit of the state and its residents.

Companies have historically been relatively poor about reporting unclaimed property to the state. This poor reporting may be attributable to various factors, including the general lack of knowledge on the part of companies as to their reporting obligations. Failure to properly report unclaimed property may make it more difficult for the rightful owner to reclaim the unclaimed property, since the owner may have a difficult time locating the holder of the property. Additionally, failure to properly report unclaimed property deprives the states and their citizens of the benefits that inure to the holder in the form of interest that is otherwise earned by a state's investment of the unclaimed property.

As a result of recent compliance efforts, the reporting of unclaimed property by companies has improved. However, it is believed that a number of companies that hold unclaimed property, and therefore should report unclaimed property, still fail to do so. Additionally, it is believed that a number of companies that hold unclaimed property and that file reports with one or more states do not fully report the unclaimed property that is held. As such, these non-reporting and under-reporting companies are not only subjecting themselves to the penalties that may be imposed under the various state statutes governing the reporting of unclaimed property, but the states and their citizens are deprived of the interest or other investment income from the unclaimed property that should have been remitted to the state. As such, it would be advantageous to provide improved techniques for monitoring compliance with the reporting of unclaimed property and for further educating companies regarding their reporting obligations such that a greater percentage of unclaimed property is reported in compliance with the various state statutes.

BRIEF SUMMARY OF THE INVENTION

Methods, apparatus and computer program products are therefore provided for monitoring compliance in reporting unclaimed property. In one embodiment, potential non-reporters and potential under-reporters are separately identified such that an audit or other follow-up procedure may be conducted to ensure compliance. With respect to identifying potential under-reporters, methods, apparatus and computer program products of one embodiment conduct a multi-level review in order to more comprehensively identify potential under-reporters. As a result of the methods, apparatus and computer program products of the present invention, compliance in reporting unclaimed property may increase, both as a result of further education of the reporting entities and the deterrent effect of being identified as a potential non-reporter or a potential under-reporter, which may subject an entity to an audit or other follow-up procedure.

According to one aspect of the present invention, a method of monitoring compliance in reporting unclaimed property receives information regarding entities that have reported unclaimed property during at least one prior reporting period. This information is generally maintained in a state's unclaimed property reporting records database. Typically, reporting data for at least one reporting period is required to perform an analysis, however, the larger the number of report cycles available for review improves the quality of the analysis. Accuracy of the analysis increases when about 10 reports or more are available for review. A plurality of candidate entities that are considered to have a reporting obligation are then identified based upon a predefined criteria. The candidate entities are then compared with those entities that have reported unclaimed property to identify as a potential non-reporter any candidate entity that has not previously reported unclaimed property. The candidate entities that previously reported unclaimed property are further evaluated to determine if the previous reports of unclaimed property satisfied predetermined conditions and, if not, to identify any such candidate entities as a potential under-reporter.

In addition to identifying potential non-reporters and potential under-reporters, those entities that have filed negative reports of unclaimed property during at least one prior reporting period are also identified. Once the potential non-reporters and potential under-reporters have been identified, an audit, at the discretion of a state or jurisdiction, may be conducted of those candidate entities that have been identified. As such, these candidate entities may be brought into compliance, if so required.

As noted above, candidate entities that previously reported unclaimed property are reviewed to identify potential under-reporters. In this regard, the candidate entities that previously reported unclaimed property may be evaluated to determine if several different predetermined conditions have been met in order to determine if the candidate entities are potential under-reporters. In one embodiment, for example, a method of monitoring compliance and reporting unclaimed property initially identifies a plurality of candidate entities that are considered to have a reporting obligation based upon a predefined criteria. The candidate entities are then reviewed to determine if any candidate entity is a potential under-reporter based on a multilevel review. The multilevel review includes the application of one or more test(s) selected from the group consisting of: (i) a review to determine if a respective candidate entity has recently reported unclaimed property, (ii) a review to identify any gaps in the recent reporting of unclaimed property by the respective candidate entity, (iii) a review, if the respective candidate entity is a publicly traded entity, to determine if unclaimed securities-related properties have been reported, (iv) a comparison of the unclaimed property of at least one predetermined general ledger account that has been reported by the respective candidate entity to a predefined threshold, (v) a review of the types of unclaimed property expected to be reported by the respective candidate entity and (vi) a comparison of the reporting history of the respective candidate entity to either the reporting history of another entity or an anticipated reporting of a model entity within the same industry as a respective candidate entity. The candidate entities identified as potential under-reporters may then be audited.

In one embodiment, the comparison of the unclaimed property of at least one predetermined general ledger account includes a comparison of one or more of the unclaimed accounts receivable, unclaimed accounts payable, unclaimed common general ledger account and unclaimed payroll that have been reported by the candidate entity to respective predefined thresholds. Additionally, in reviewing the types of unclaimed property that are expected to be reported by the respective candidate entities, the expectations of the types of unclaimed property that have been reported are typically based upon the industry of the candidate entity.

In addition to the methods set forth above, an apparatus including a processing element and a computer program product, including at least one computer-readable storage medium having computer readable program code portions stored therein, are also provided for monitoring compliance in reporting unclaimed property. Regardless of the implementation of the present invention as a method, apparatus or computer program product, the various embodiments of the present invention assist in monitoring compliance in reporting unclaimed property. By identifying and then following up with potential non-reporters and potential under-reporters, more entities may be brought into compliance. In addition, the awareness and knowledge of entities as to their reporting obligations should be enhanced which, in turn, should lead to a greater percentage of unclaimed property also being properly reported in future years. The general public may also benefit as a result of the greater compliance with the unclaimed property reporting requirements by providing states non-tax income inuring to the benefit of the state and its citizens. Additionally, the general public may also benefit from the awareness of a larger number of accounts that may be claimed by the rightful owner or heir that result from increased reporting compliance.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2 is a representative screen display that is populated in creating a profile of a candidate entity;

DETAILED DESCRIPTION OF THE INVENTION

Figure 1A:
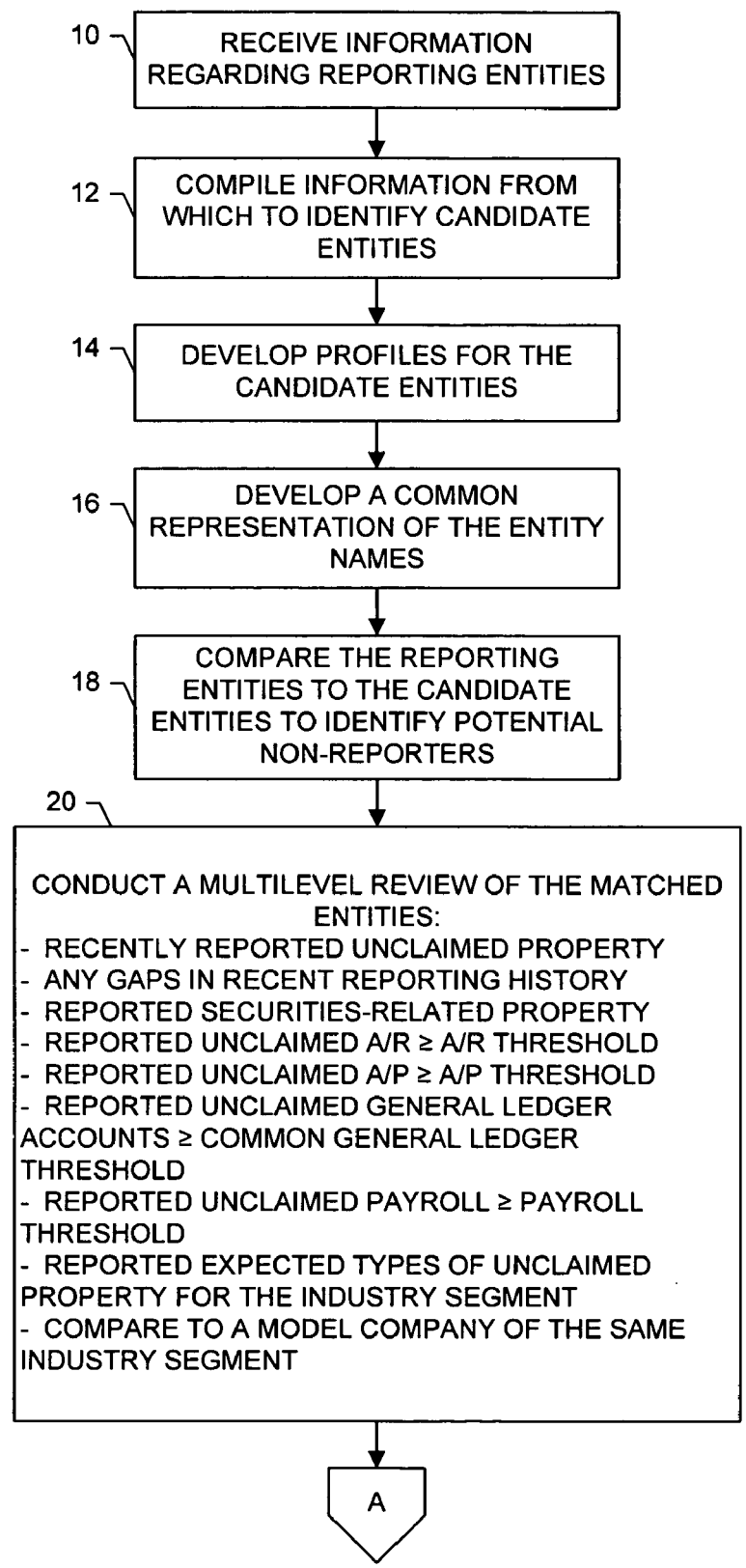
FIGS. 1a and 1b are flowcharts illustrating the operations performed in accordance with one embodiment of the present invention.

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

According to the present invention, methods, apparatus and computer program products for monitoring compliance in reporting unclaimed property are provided. As initial steps, information regarding entities, such as companies, associations, partnerships and the like, that have reported unclaimed property during at least one prior reporting period, such as during a prior year is received and a plurality of candidate entities that are considered to have a reporting obligation are separately identified based upon a predefined criteria. See steps 10 and 12 of FIG. 1a.

With respect to the entities that have reported unclaimed property during a prior year, information is generally obtained from the various states and, in particular, from databases maintained by the states that define the holders of unclaimed property known to that state. In order to increase the accuracy of the analysis, this information is generally obtained for a number of recent reporting periods, such as the most recent ten reporting periods. With respect to the identification of candidate entities considered to have a reporting obligation, these candidate entities are generally initially identified without consideration as to whether or not the candidate entities have previously reported unclaimed property. Instead, a pool of potential candidates is identified and is then evaluated to determine if the potential candidates meet a predefined criteria. The pool of potential candidates may be defined in various manners. For example, the pool of potential candidates may include all public and private companies within a particular state. From this pool of potential candidates, the candidate entities are identified as those that meet a predefined criteria. Typically, the predefined criteria may be a predefined level of annual revenue, such as $100,000,000, $80,000,000 or the like. However, other types of predefined criteria may be utilized, such as number of employees, value of assets, such as in the instance of a bank or other financial institution or the value of premiums written in a particular state in the instance of an insurance company. The foregoing examples are merely for purposes of illustration and it should be apparent that a wide variety of predefined criteria may be employed depending up the type of entity and the number of candidate entities that are desired to be identified.

The information from which the pool of potential candidates is initially constructed and the information that is relied upon in order to determine if the potential candidates satisfy the predefined criteria may come from various sources, although Dun & Bradstreet, A.M. Best, Standard & Poor's and Lexis/Nexis are representative examples. Additionally or alternatively, this information may be derived from filings made by the various entities to the Securities Exchange Commission or other governmental or organizational entities. Similarly, information may be drawn from disclosure documents filed by insurance companies as well as on-line information provided generally by the entity in question or from other third parties.

Once the plurality of candidate entities that meet the predefined criteria and which therefore are initially considered to potentially have a reporting obligation are identified, a profile may be developed for each candidate entity, as shown in step 14 of FIG. 1a. While the profile may include various types of information, one representative profile include the Federal Employer Identification Number (FEIN), the Standard Industry Code (SIC), the state of incorporation, the year of incorporation, the year in which the business began, the type of company, the annual revenue, assets or premiums written, the number of employees, the transfer agent in the case of a public company, the independent certified public accountant (CPA), bankruptcy information, a description of the business including, for example, information relating to any recent move, the nature of the business activity and any litigation or bankruptcy filing, brief reporting comments, the report classification (such as non-reporter, reporter only of negative amounts of unclaimed property, or any of the various types of under-reporters as described below), the state status (such as the status of any audit or other follow up procedure), the company contact by name with title, address and telephone number. By way of example, a screen display of a representative profile is provided in FIG. 2.

Once the profile has been constructed, all known corporate relationships between the profiled entity and other entities are noted. In this regard, any name changes may be noted as well as any other names under which the company does business, i.e., d/b/a. Additionally, all subsidiaries of the profiled entity may be identified. In addition, all relevant merger and acquisition activity should be noted. In this regard, if the profiled company has been acquired, the name of the acquiring company should be identified. Similarly, if the profiled company has acquired another company, the acquired company should be identified. Likewise, mergers should be identified with an indication of the companies that merged with the profiled company as well as an identification as to whether the profiled company is the surviving company. By identifying all name changes, other names under which the company conducts business, all subsidiaries and all mergers and acquisition activity, the profiled company and its reporting history can more accurately be considered during the analysis set forth since not only the profiled company but also all related companies may be collectively considered.

The candidate entities and their related entities that have been identified above are then each compared with the entities that have previously reported unclaimed property, such as those identified by data downloaded from a state database. See block 18 of FIG. 1a. Based upon this comparison, if neither the candidate entity nor any of its related entities have previously reported unclaimed property, the candidate entity may be identified as a potential non-reporter, while if either the candidate entity or any of its related entities has previously reported unclaimed property, the candidate entity and its related entities will be further analyzed to identify if the candidate entity and its related entities have reported, but perhaps not fully, thereby under-reporting the unclaimed property being held.

In order to accurately compare the candidate entities and their related entities with those entities that have previously reported unclaimed property, it is advantageous to develop a common representation for the entity names so as to ensure that the entities are properly matched even if there are some minor variations, such as in punctuation, abbreviations or the like between the information that was received regarding entities that previously reported unclaimed property and the information regarding the candidate entities. See block 16. Although the names of the entities may be represented in various fashions, one technique for representing the names of the entities is provided below for purposes of illustration but not of limitation. In this regard, a number of predefined terms that do not serve to individually identify a company may be removed. For example, terms such as company, corporation, incorporated, limited and the like, and abbreviations such as co., corp., inc., ltd. or like may be removed. In order to simplify the subsequent comparison process and to more compactly represent the names of the various companies, common portions of a name may be represented by predefined character. For example, "National Bank" may be represented by "&c". Furthermore, all punctuation and spaces may be removed to create an uninterrupted string of alphanumeric characters.

Once the name of the entities and their relationships have been represented in a common fashion, one or more matching techniques may be employed to compare and match candidate entities (hereinafter "candidate entities" will denote both the candidate entities and their related entities that have been identified above) that may have a reporting obligation with those entities that have previously reported unclaimed property. One series of matching techniques is described below for purposes of illustration, but others may be employed without departing from the spirit and scope of the present invention. As an initial point of comparison, the Federal Identification Numbers of the candidate entities may be compared with the Federal Identification Numbers of those entities that have previously reported unclaimed property in any state. The complete name, as currently represented by the uninterrupted string of alphanumeric characters, may be compared to the complete name, again as represented by the uninterrupted string of alphanumeric characters, of the entities that have previously reported unclaimed property to any state to identify those that match. A further comparison based upon a truncated representation of the names of the candidate entities may be performed. While the names of the candidate entities may be truncated in various fashions, the first nine bytes of the name of each candidate entity, as now represented by the uninterrupted string of alphanumeric characters, is compared to the first nine bytes of the names of the entities that have previously reported unclaimed property to any state, as also now represented by the uninterrupted string of alphanumeric characters, with matches therebetween being identified. This additional level of matching is to try and identify entities that have different endings which may occur occasionally due to truncation of words.

While each of the foregoing comparisons has been performed with the information relating to the reporting history of entities from all states, i.e., entities that have previously reported unclaimed property to any state, an additional comparison may be made based upon the reporting history provided by a particular state. While various comparisons may be made, the comparison is generally simpler and less restrictive since the number of entities that have reported unclaimed property to a specific state are a smaller group than those previously considered. In this regard a comparison of a truncated portion of the name of each candidate entity, as now represented by the uninterrupted string of alphanumeric characters, is made to a similarly truncated representation of the names of the entities that previously reported unclaimed property to the particular state, again as represented by an uninterrupted string of alphanumeric characters. As noted more generally above, since the comparison is made based upon the data provided by a particular state, the names may be further truncated in order to identify additional matches that were not previously identified when considering the reporting history provided by all states. While the names may be truncated in various manners, the names of one embodiment are truncated such that the first seven bytes of the name of each candidate entity is compared with the first seven bytes of the names of the entities that previously reported unclaimed property to the particular state to identify matches.

If desired, a manual process is then performed to confirm the matches automatically identified in the above-described manner and to remove any false matches. In addition, further matches may be identified by searching on unique words within the entity name to identify other formats of the name entered, and to also try to identify any misspellings of entity names.

The candidate entities that remain unmatched following the various matching routines will generally be considered to be potential non-reporters. Entities that have previously filed negative reports of unclaimed property only are considered and treated in the same fashion as potential non-reporters.

Of the candidate entities that were matched in one of the preceding steps with entities that had previously reported unclaimed property, a further evaluation of these candidate entities is conducted to determine if these candidate entities have potentially underreported unclaimed property. In one advantageous embodiment, the candidate entities that have been matched with an entity that previously reported unclaimed property are evaluated based upon a multilevel review, as shown in block 20 of FIG. 1*a*. In this regard, the method, apparatus and computer program product of one embodiment of the present invention conduct a series of tests to evaluate whether or not a candidate entity is a potential under reporter, as described below. It is noted, however, that not all of the following tests need be conducted and, instead, the multilevel review may consist of any combination of the following tests.

In one embodiment, the candidate entities that were matched to an entity that previously reported unclaimed property are initially evaluated to determine if the candidate entities previously reported unclaimed property recently to a particular state. The time frame for determining whether a candidate entity has recently reported unclaimed property may be defined in various manners. In one embodiment, however, a candidate entity is considered to have recently reported unclaimed property if the candidate entity has reported unclaimed property within a predefined number of years, such as within the last five years. If the candidate entity is determined not to have reported unclaimed property within the predefined number of years, the candidate entity may be categorized as a potential under-reporter. If the candidate entity has reported unclaimed property within the predefined number of years, the reporting history of the candidate entity may be evaluated to determine if the candidate entity has reported unclaimed property in each of the predefined years, such as in each of the last five years. If the candidate entity has not reported in one or more of the predefined years such that a gap in reporting exists, the candidate entity may also be categorized as a potential under-reporter.

For candidate entities that have reported unclaimed property in each of the predefined years, the type and/or the quantity of unclaimed property is then examined to determine if it is appropriate. In this regard, if the candidate entity is a publicly traded company, the reporting history of the candidate entity is reviewed to determine if the candidate entity has reported unclaimed securities-related properties, such as unclaimed shares of stock and related dividends. If so, the evaluation of the candidate entity may continue as described below. If not, however, the candidate entity may be considered a potential under reporter since although the candidate entity has reported unclaimed property in the recent past, the candidate entity has not reported unclaimed securities-related properties as would be expected of a publicly traded company.

Thereafter, the candidate entities may be subjected to one or more general ledger-related tests. In this regard, the unclaimed property that has been reported by the candidate entity from each of several specific general ledger accounts may be evaluated in comparison to respective predefined thresholds. In this regard, the unclaimed accounts receivables (A/R) that have been reported by the candidate entity are compared to a prefined A/R threshold. Likewise, the unclaimed accounts payable (A/P) and the unclaimed common general ledger accounts are compared to predefined A/P and common general ledger thresholds, respectively. In addition, the unclaimed payroll that has been reported by the candidate entity is compared to a predefined payroll threshold.

The average annual predefined thresholds may differ from one another and may be defined in any desired manner. In one embodiment, the predefined A/R, A/P and common general ledger thresholds may all be defined to equal $5000, while the predefined payroll threshold is defined to be $1000. However, the thresholds need not be defined to equal a single value, but may, instead, be defined to vary in a predefined manner based upon one or more parameters. For example, the thresholds may be defined to equal a predetermined percentage of the gross revenues, assets or premiums written by a respective candidate entity. Still further, several different values may be defined for the thresholds with the particular value being selected based upon one or more parameters, such as the industry sector, gross revenues, assets or premiums written by a respective candidate entity.

A candidate entity may be considered to be a potential under reporter if the candidate entity fails a predefined number of the general ledger tests. For example, a candidate entity may be considered to be a potential under reporter in one embodiment if the candidate entity fails any two of the general ledger tests.

The type of unclaimed property previously reported by a candidate entity may then be further evaluated to determine if the most likely types of unclaimed property have been reported. Since the type of unclaimed property that is reported generally varies based upon the industry segment of the candidate entity, the industry segment of the candidate entity may be identified, such as by consideration of the SIC code associated with the candidate entity. In one embodiment, for example, the industry segment of the candidate entity is identified based upon the first two digits of the SIC code. As will be apparent, the industry segment can be identified with more or less granularity, if so desired. According to this test, the type(s) of unclaimed property that should most frequently be reported are predefined for each respective industry segment. For example, utilities will commonly report deposit refunds or insurance companies will commonly report benefit disbursements. As such, each candidate entity may be evaluated based upon its industry segment to determine if the type(s) of unclaimed property that should most frequently be reported by companies within the respective industry segment have been reported. If not, the candidate entity may be considered an under reporter since although the candidate entity reported unclaimed property, the candidate entity did not report the expected type(s) of unclaimed property.

If the candidate entity has reported the expected types of unclaimed property and has otherwise passed each of the foregoing tests, the candidate entity may not be flagged as a potential under reporter and may therefore not be subjected to further review as described below. In one embodiment, however, a candidate entity that has reported the expected types of unclaimed property and has otherwise passed each of the foregoing tests may still be subjected to an additional overall test. In this regard, the reporting profile of a company within the same industry segment as the candidate entity that has properly reported an average and/or an anticipated amount of unclaimed property of the expected type(s) may be constructed. This reporting profile may be based upon an actual company within the same industry segment that is known to have properly reported an average and/or anticipated amount of unclaimed property of the expected type(s). Alternatively, the reporting profile of a hypothetical company in the same industry segment may be constructed that is considered to have reported an average and/or anticipated amount of unclaimed property of the expected type(s).

The candidate entity is compared to the predefined reporting profile. If the candidate entity is found to have reported the expected type(s) of unclaimed property in at least the average and/or anticipated amounts, the candidate entity will be considered to have passed this additional test. Instead of having to have reported unclaimed property of the expected type(s) in amounts that meet or exceed the average and/or anticipated amounts, other tests may be employed such as by permitting the candidate entity to pass the test even if the candidate entity has reported less than the average and/or anticipated amounts so long as the candidate entity has reported amounts that are within a predetermined percentage, either on an individual basis or in the aggregate, of the average and/or anticipated amounts. If the candidate entity is found to have not reported the average and/or anticipated amounts of the expected type(s) of unclaimed property as defined by the predefined reporting profile or to have otherwise failed this test, the candidate entity may again be categorized as a potential under reporter.

While a variety of tests have been described above that all must be successfully passed by a candidate entity that has previously reported unclaimed property to avoid classification as a potential under reporter, it should be apparent to those skilled in the art that the foregoing tests are provided by way of illustration and not of limitation. In this regard, the multilevel review of this embodiment of the present invention may employ any of the foregoing tests, in order to identify potential under reporters. By employing a wide variety of tests as described above that not only merely confirm reporting with the state in question, but also confirm that anticipated amounts have been reported for different expected types of unclaimed property, a more comprehensive review of the reporting history of a candidate entity may be conducted. As such, additional potential under reporters may be identified, while avoiding any further review of entities that appear to be properly reporting unclaimed property.

Figure 1B:
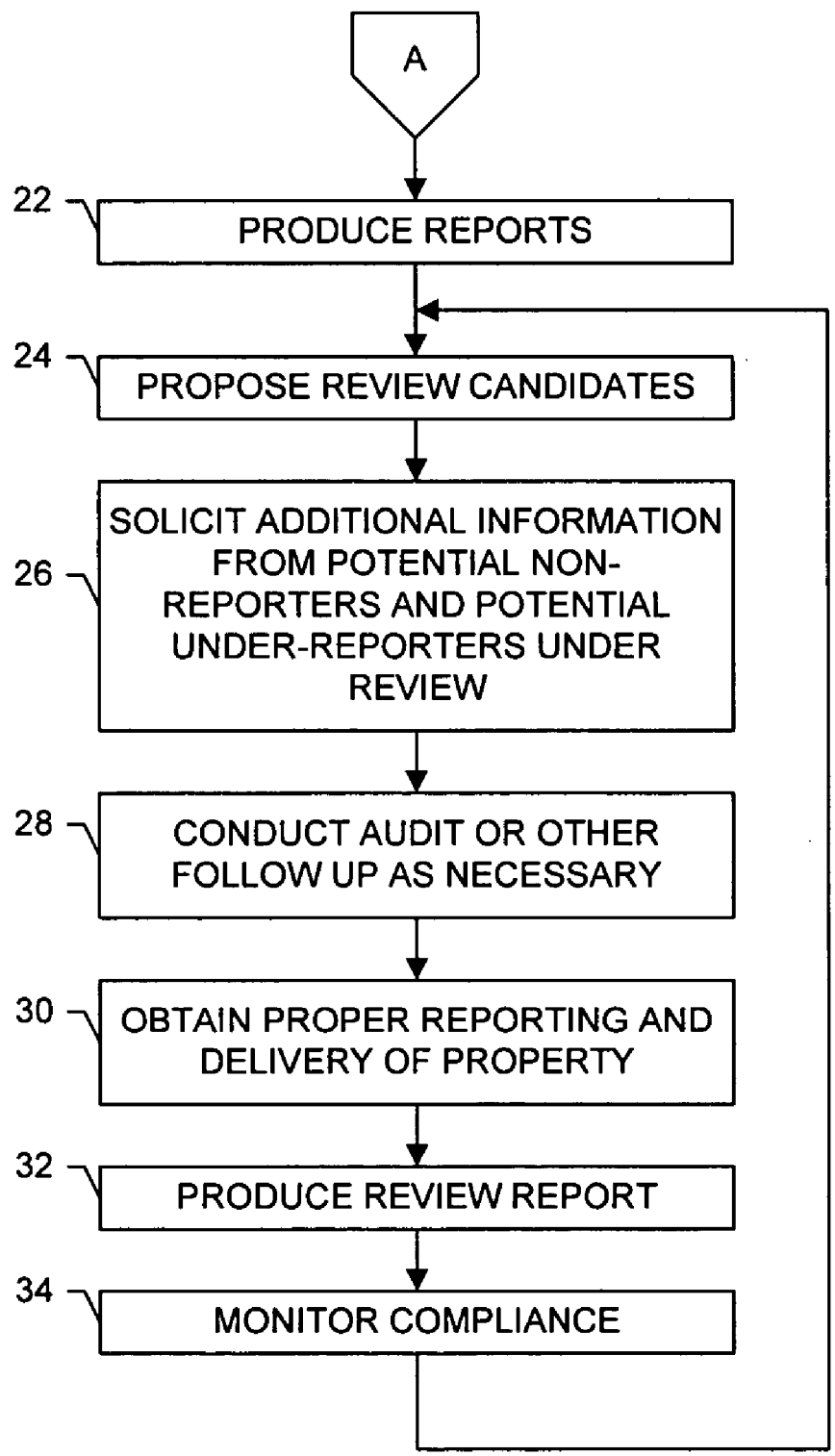

Information relating to the potential non-reporters and the potential under reporters may be provided to a state via various reports as shown in block 22 of FIG. 1b. In one embodiment, for example, the state is provided access to a web interface via which the reports and other information can be delivered. Included in this information regarding the potential non-reporters and the potential under reporters may be a proposal identifying the potential non-reporters and the potential under reporters that should initially be subject to a further review, as shown in block 24.

In this regard, for those candidate entities that have been identified as a potential non-reporter or a potential under reporter, further review may be conducted as dictated by the state, such as in a tiered approach as described below. First, the potential non-reporter or potential under reporter may be contacted and additional information relevant to the reporting of unclaimed property may be collected. See block 26. Based on this additional information, a more detailed and individualized analysis of the reporting history of the entity may be conducted. If, as a result of this more detailed analysis, it is determined that the entity has properly reported its unclaimed property, the entity may reclassified so as to no longer be considered either a potential non-reporter or a potential under reporter.

If the additional information is not provided or is incomplete or if the more detailed analysis does not indicate that the entity has properly reported its unclaimed property, it may be such that during the process of collecting and providing the additional information, the entity has learned more about the unclaimed property reporting requirements of the state and, as a result, may reevaluate its prior reporting history and cure any deficiencies that are noted, thereby also allowing the entity to be reclassified so as to no longer be considered either a potential non-reporter or a potential under reporter. Alternatively, if the initial request for additional information does not evidence that the entity has properly reported its unclaimed property and if the entity does not voluntarily bring its unclaimed property reporting into compliance, an audit or other review may be conducted by the state or a third party that is acting on behalf of the state. See block 28. As such, further details regarding the unclaimed property held by the entity and its reporting history may be obtained such that a more detailed analysis can be conducted to determine if the entity has properly reported the unclaimed property that it holds. If this more detailed review reveals that the entity has properly reported the unclaimed property, the entity is recategorized so as no longer to be considered a potential non-reporter or a potential under reporter. If, however, the entity fails to cooperate or if the more detailed review indicates that the entity has not properly reported the unclaimed property that it holds, the state may pursue the enforcement procedures that are generally defined by state statute to obtain proper reporting and delivery of the unclaimed property that should have been remitted to the state. See block 30. Alternatively, the entity may have learned more about its reporting obligations during the audit and reevaluated its reporting history and may voluntarily cure any deficiencies that are noted in order to permit the entity to be reclassified so as no longer be considered either a potential non-reporter or a potential under reporter.

Throughout the process of collecting additional information and conducting a further review and/or audit, additional reports and other information may be provided to the state, such as via the web interface, as shown in block 32. Following completion of the process, the ongoing compliance of the entities may continue to be monitored and any appropriate follow up activities undertaken to insure continued compliance. See block 34. Upon completing this more detailed review process for one or a group of potential non-reporters or potential under reporters, this more detailed review may be proposed to the state for any additional potential non-reporters or potential under reporters that have been preliminarily identified, but have not yet been reviewed in detail.

Figure 3:
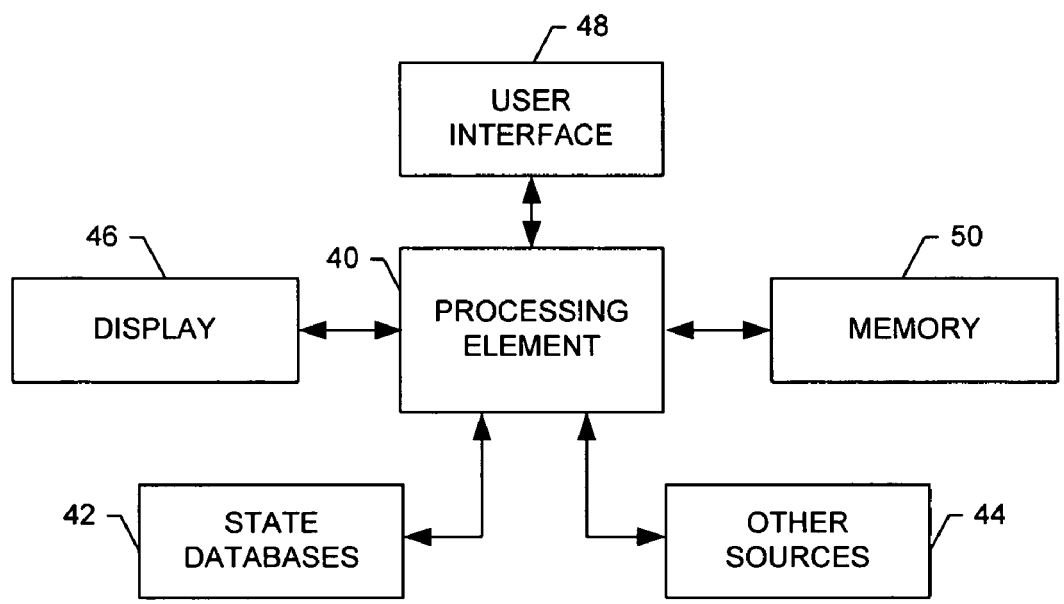
FIG. 3 is a block diagram of an apparatus of one embodiment of the present invention.
Figure 4:
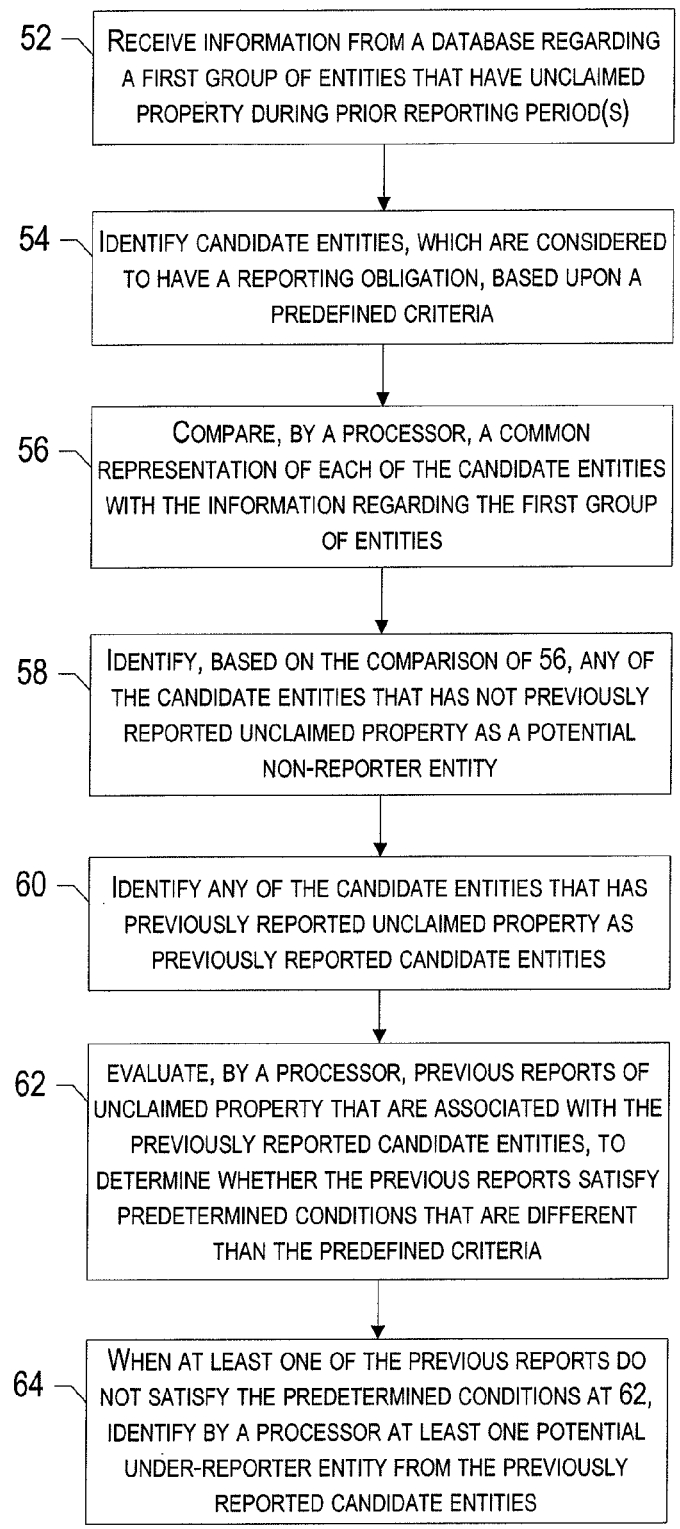
FIG. 4 is a flowchart illustrating operations performed in accordance with one embodiment of the present invention.

In addition to the foregoing inventive methods, an apparatus is provided according to another aspect of the present invention that is capable of operating in accordance with the various embodiments that have been described above. In this regard, the apparatus may be embodied in one or more computer systems, such as one or more of a laptop computer, desktop computer, server computer or the like. As shown in FIG. 3, the apparatus generally includes a processing element 40, such as a processor or other computing device, connected to at least one interface or other means for displaying, transmitting and/or receiving data, content or the like. In this regard, the interface(s) can include at least one communication interface or other means for transmitting and/or receiving data, content or the like, such as between the processing element and the state databases 42 and other sources 44 of information, as well as at least one user interface that can include, for example, a display 46 and/or a user input interface 48. The user input interface, in turn, can comprise any of a number of devices allowing the entity to receive data from a user, such as an electronic scanner, keyboard, mouse and/or any of a number of other devices, components or the like capable of receiving data, content or the like.

In addition to the interfaces, the processing element 40 can be connected to a memory 50. The memory can comprise volatile and/or non-volatile memory, and typically stores content, data or the like. In this regard, the memory typically stores software applications, instructions or the like for directing the processing element to perform steps in accordance with embodiments of the present invention.

As described above, the apparatus and, in particular, the processing element 40 generally operates under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 1a and 1b are flowcharts of methods, systems and program products according to embodiments of the present invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of block(s) or step(s) in the flowchart, can be implemented by special purpose hardware-based computer systems which perform the specified functions or steps, or combinations of special purpose hardware and computer instructions.

The foregoing methods, apparatus and computer program products of the various aspects of the present invention therefore provide a mechanism for identifying entities that have not reported or are likely to have under reported unclaimed property such that more intensive evaluations of these entities may be conducted to determine if the entities have not complied with the reporting obligations mandated by the state. As such, the methods, apparatus and computer program products of the present invention may lead to greater compliance with the unclaimed property reporting requirements of the states. Beneficially, the interaction with the entities that have been identified as potential non-reporters or potential under reporters may serve to further educate the entities as to their reporting obligations so that not only are the entities brought into current compliance with the unclaimed property reporting requirements, but the entities are more likely to properly report unclaimed property in the future without requiring further audits or other individualized measures. Because of the greater compliance with the unclaimed property reporting requirements attributable to the present invention, a greater percentage of the unclaimed property should be remitted to the states, thereby resulting in increased interest or other investment income which inures to the benefit of the citizens of the states Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
receiving information from a database, the information regarding a first group of entities that have reported unclaimed property during at least one prior reporting period;
identifying candidate entities that are considered to have a reporting obligation, the identifying of the candidate entities is based upon a predefined criteria;
comparing, by a processor, a common representation of each of the candidate entities with the information regarding the first group of entities;
identifying, based on the comparing, any of the candidate entities that has not previously reported unclaimed property as a potential non-reporter entity;
identifying any of the candidate entities that has previously reported unclaimed property as previously reported candidate entities;
evaluating, by a processor, previous reports of unclaimed property, the previous reports are associated with the previously reported candidate entities, to determine whether the previous reports satisfy predetermined conditions, the predetermined conditions are different than the predefined criteria; and
when at least one of the previous reports do not satisfy the predetermined conditions, identifying by a processor at least one potential under-reporter entity from the previously reported candidate entities.

2. A method according to claim 1 further comprising conducting a follow-up procedure specific to a candidate entity identified as at least one of a potential non-reporter entity and a potential under-reporter entity.

3. A method according to claim 1 wherein, when a respective candidate entity of the previously reported candidate entities is a publicly traded entity, said evaluating the respective candidate entity comprises determining if unclaimed securities related properties have been reported for the respective candidate entity.

4. A method according to claim 1, wherein evaluating the previously reported candidate entities comprises reviewing the previously reported candidate entities to determine if any of the previously reported candidate entities is a potential under-reporter based on a multilevel review comprising tests selected from the group consisting of:
(i) a review to determine if a respective candidate entity of the previously reported candidate entities has recently reported unclaimed property,
(ii) a review to identify any gaps in the recent reporting of unclaimed property by the respective candidate entity,
(iii) when the respective candidate entity is a publicly traded entity, a review to determine if unclaimed securities-related properties have been reported,
(iv) a comparison of unclaimed property of at least one predetermined general ledger account that has been reported by the respective candidate entity to a predefined threshold,
(v) a review of types of unclaimed property expected to be reported by the respective candidate entity, and
(vi) a comparison of a reporting history of the respective candidate entity to one of the reporting history of another entity or an anticipated reporting of a model entity within the same industry as the respective candidate entity.

5. A method according to claim 4 further comprising:
identifying a potential under reporter in the previously reported candidate entities; and
conducting an audit of the potential under-reporter.

6. A method according to claim 4, wherein the comparison of the unclaimed property of the at least one predetermined general ledger account comprises a comparison of at least one of unclaimed accounts receivables, unclaimed accounts payable and unclaimed payroll that has been reported by the respective candidate entity to respective predefined thresholds.

7. A method according to claim 4, wherein the review of the types of unclaimed property comprises a review of the types of unclaimed property expected to be reported by the respective candidate entity based upon the respective candidate entity's industry.

8. A system, comprising:
a database configured to store information regarding a first group of entities that have reported unclaimed property during at least one prior reporting period;
a computing device configured to:
receive the information regarding the first group of entities from the database;
identify candidate entities that are considered to have a reporting obligation, the candidate entities are identified based upon a predefined criteria;
compare a common representation of each of the candidate entities with the information regarding the first group of entities to identify any of the candidate entities that has not previously reported unclaimed property as a potential non-reporter entity;
identify any of the candidate entities that previously reported unclaimed property as previously reported candidate entities;
evaluate previous reports of unclaimed property, the previous reports are associated with the previously reported candidate entities, to determine whether the previous reports satisfy predetermined conditions, the predetermined conditions are different than the predefined criteria; and
when the previous reports of unclaimed property do not satisfy the predetermined conditions, identify at least one potential under-reporter entity from the previously reported candidate entities.

9. The system according to claim 8 wherein, when a respective candidate entity of the previously reported candidate entities is a publicly traded entity, said computing device is configured to determine if unclaimed securities related properties have been reported for the respective candidate entity.

10. The system according to claim 8, wherein said computing device is further configured to review the candidate entities to determine if any previously reported candidate entities is a potential under-reporter based on a multilevel review comprising tests selected from the group consisting of:
(i) a review to determine if a respective candidate entity of the previously reported candidate entities has recently reported unclaimed property,
(ii) a review to identify any gaps in the recent reporting of unclaimed property by the respective candidate entity,
(iii) when the respective candidate entity is a publicly traded entity, a review to determine if unclaimed securities-related properties have been reported, (iv) a comparison of unclaimed property of at least one predetermined general ledger account that has been reported by the respective candidate entity to a predefined threshold, (v) a review of types of unclaimed property expected to be reported by the respective candidate entity, and (vi) a comparison of a reporting history of the respective candidate entity to one of the reporting history of another entity or an anticipated reporting of a model entity within the same industry as the respective candidate entity.

11. The system according to claim 10, wherein said computing device is configured to make the comparison of unclaimed property of the at least one predetermined general ledger account by comparing at least one of unclaimed accounts receivables, unclaimed accounts payable and unclaimed payroll that has been reported by the respective candidate entity to respective predefined thresholds.

12. The system according to claim 10, wherein said computing device is configured to conduct the review of the types of unclaimed property by reviewing the types of unclaimed property expected to be reported by the respective candidate entity based upon the respective candidate entity's industry.

13. A computer program product for monitoring compliance in reporting unclaimed property, the computer program product comprising at least one computer-readable storage medium having computer-readable program code portions stored therein, the computer-readable program code portions comprising:

a first executable portion configured to receive information, from a database, regarding entities that have reported unclaimed property during at least one prior reporting period;

a second executable portion configured to identify candidate entities that are considered to have a reporting obligation, the candidate entities are identified based upon a predefined criteria;

a third executable portion configured to compare the candidate entities with the entities to identify any of the candidate entities that has not previously reported unclaimed property as a potential non-reporter entity;

a fourth executable portion configured to identify any of the candidate entities that previously reported unclaimed property as previously reported candidate entities; and a fifth executable portion configured to evaluate previous reports of unclaimed property, the previous reports are associated with the previously reported candidate entities, to determine whether the previous reports satisfy predetermined conditions, the predetermined conditions are different than the predefined criteria, and, when the previous reports of unclaimed property do not satisfy the predetermined conditions, to identify at least one potential under-reporter entity from the previously reported candidate entities.

14. A computer program product according to claim 13 wherein, when a respective candidate entity of the previously reported candidate entities is a publicly traded entity, said fifth executable portion is configured to determine if unclaimed securities related properties have been reported for the respective candidate entity.

15. A computer program product according to claim 13, wherein the fifth executable portion is configured to evaluate the previously reported candidate entities by reviewing the previously reported candidate entities to determine if any of the previously reported candidate entities is a potential under-reporter based on a multilevel review comprising tests selected from the group consisting of:

(i) a review to determine if a respective candidate entity of the previously reported candidate entities has recently reported unclaimed property, (ii) a review to identify any gaps in the recent reporting of unclaimed property by the respective candidate entity, (iii) when the respective candidate entity is a publicly traded entity, a review to determine if unclaimed securities-related properties have been reported, (iv) a comparison of unclaimed property of at least one predetermined general ledger account that has been reported by the respective candidate entity to a predefined threshold, (v) a review of types of unclaimed property expected to be reported by the respective candidate entity, and (vi) a comparison of a reporting history of the respective candidate entity to one of the reporting history of another entity or an anticipated reporting of a model entity within the same industry as the respective candidate entity.

16. A computer program product according to claim 15, wherein said fifth executable portion is configured to make the comparison of the unclaimed property of the at least one predetermined general ledger account by comparing at least one of unclaimed accounts receivables, unclaimed accounts payable and unclaimed payroll that has been reported by the respective candidate entity to respective predefined thresholds.

17. A computer program product according to claim 15, wherein said fifth executable portion is configured to conduct the review of the types of unclaimed property by reviewing the types of unclaimed property expected to be reported by the candidate entity based upon the respective candidate entity's industry.

* * * * *